United States Patent
Schilling et al.

(10) Patent No.: US 12,540,214 B2
(45) Date of Patent: Feb. 3, 2026

(54) HCFO-CONTAINING ISOCYANATE-REACTIVE COMPOSITIONS, RELATED FOAM-FORMING COMPOSITIONS AND POLYURETHANE FOAMS

(71) Applicant: Covestro LLC, Pittsburgh, PA (US)

(72) Inventors: Steven Schilling, Presto, PA (US); Albert Peterson, Burgettstown, PA (US)

(73) Assignee: Covestro LLC, Pittsburgh, PA (US)

( * ) Notice: Subject to any disclaimer, the term of this patent is extended or adjusted under 35 U.S.C. 154(b) by 1182 days.

(21) Appl. No.: 17/775,717

(22) PCT Filed: Jan. 8, 2020

(86) PCT No.: PCT/US2020/012650
§ 371 (c)(1),
(2) Date: May 10, 2022

(87) PCT Pub. No.: WO2020/146442
PCT Pub. Date: Jul. 16, 2020

(65) Prior Publication Data
US 2022/0403096 A1    Dec. 22, 2022

Related U.S. Application Data

(60) Provisional application No. 62/791,163, filed on Jan. 11, 2019.

(51) Int. Cl.
| | | |
|---|---|---|
| *C08G 18/76* | (2006.01) | |
| *C08G 18/20* | (2006.01) | |
| *C08G 18/22* | (2006.01) | |
| *C08G 18/40* | (2006.01) | |
| *C08G 18/42* | (2006.01) | |
| *C08G 18/48* | (2006.01) | |
| *C08G 18/50* | (2006.01) | |
| *C08J 9/08* | (2006.01) | |
| *C08J 9/14* | (2006.01) | |
| *C08L 75/06* | (2006.01) | |
| *C08L 75/08* | (2006.01) | |

(52) U.S. Cl.
CPC ..... *C08G 18/7664* (2013.01); *C08G 18/2027* (2013.01); *C08G 18/2081* (2013.01); *C08G 18/225* (2013.01); *C08G 18/4018* (2013.01); *C08G 18/4208* (2013.01); *C08G 18/4816* (2013.01); *C08G 18/482* (2013.01); *C08G 18/4837* (2013.01); *C08G 18/5021* (2013.01); *C08J 9/08* (2013.01); *C08J 9/144* (2013.01); *C08L 75/06* (2013.01); *C08L 75/08* (2013.01); *C08G 2110/0025* (2021.01); *C08J 2203/184* (2013.01); *C08J 2375/06* (2013.01); *C08J 2375/08* (2013.01); *C08J 2475/06* (2013.01); *C08J 2475/08* (2013.01)

(58) Field of Classification Search
CPC ............ C08G 18/2018; C08G 18/2027; C08G 18/22–26; C08G 18/161–165; C08J 9/0028; C08J 9/0052
See application file for complete search history.

(56) References Cited

U.S. PATENT DOCUMENTS

| | | | |
|---|---|---|---|
| 3,215,652 A | 11/1965 | Kaplan | |
| 4,086,213 A * | 4/1978 | Bechara | C07D 233/06 528/48 |
| 4,761,223 A | 8/1988 | Klimpel et al. | |
| 5,690,855 A | 11/1997 | Nichols et al. | |
| 6,562,880 B1 | 5/2003 | Doerge et al. | |
| 6,803,390 B2 | 10/2004 | Lekovic et al. | |
| 6,855,741 B2 | 2/2005 | Wiese et al. | |
| 7,972,524 B2 | 7/2011 | Robin | |
| 8,097,660 B2 | 1/2012 | Mautino et al. | |
| 8,133,419 B2 | 3/2012 | Burks et al. | |
| 8,163,196 B2 | 4/2012 | Basu et al. | |
| 8,658,708 B2 | 2/2014 | Loh et al. | |
| 9,000,061 B2 | 4/2015 | Ling et al. | |
| 9,051,442 B2 | 6/2015 | Williams et al. | |
| 9,453,115 B2 | 9/2016 | Williams et al. | |
| 9,550,854 B2 | 1/2017 | Van Der Puy et al. | |

(Continued)

FOREIGN PATENT DOCUMENTS

| | | |
|---|---|---|
| CN | 104 119 490 A | 10/2014 |
| CN | 104 497 254 A | 4/2015 |

(Continued)

OTHER PUBLICATIONS

Dr. L. Abele et al, Manufacturing of Rigid Polyurethane Foams, Polyurethane Handbook, 1993, pp. 253-256, 2nd Edition, Hanser Publishers; Hanser/Gardner Publications, Inc, Munich; Vienna; New York: Hanser; Cincinnati: Hanser/ Gardner.

Steven L. Schilling, Polyurethane Foams Co-Blown With a Mixture of a Hydrocarbon and a Halogenated Olefin, COV162016 MD-15-027/-16-017, U.S. Appl. No. 15/354,069, filed Nov. 17, 2016, pp. 1-49, Not published at this time.

Tauchen, Robert et al; "Optimizing Surfactant Technology for Blends of Blowing Agents in Next Generation Appliance Formulations"; pp. 1-14; Evonik Goldschmidt Corporation (Hopewell, VA) and Evonik Industries (Essen, Germany), presented at the CPI Technical Conference 2013.

(Continued)

*Primary Examiner* — Michael M Dollinger
(74) *Attorney, Agent, or Firm* — Donald R. Palladino

(57) ABSTRACT

Disclosed are HCFO-containing isocyanate-reactive compositions, polyurethane foam-forming compositions containing such isocyanate-reactive compositions, rigid polyurethane foams made using such polyurethane foam-forming compositions, and methods for producing such foams, including use of such foams as insulation in the construction of refrigerated storage devices. The isocyanate-reactive composition can exhibit a long shelf life, be shelf-stable, and produce a foam with good thermal insulation properties.

22 Claims, No Drawings

(56) References Cited

U.S. PATENT DOCUMENTS

| | | |
|---|---|---|
| 9,556,303 B2 | 1/2017 | Ross et al. |
| 2004/0014830 A1 | 1/2004 | Wiese et al. |
| 2005/0148677 A1 | 7/2005 | Elsken et al. |
| 2006/0175575 A1 | 8/2006 | Kaplan et al. |
| 2007/0173556 A1 | 7/2007 | Prange et al. |
| 2009/0305876 A1 | 12/2009 | Singh et al. |
| 2011/0037016 A1 | 2/2011 | Singh et al. |
| 2011/0218261 A1 | 9/2011 | Loh et al. |
| 2011/0315915 A1 | 12/2011 | Abbas et al. |
| 2012/0161063 A1 | 6/2012 | Singh |
| 2012/0172476 A1 | 7/2012 | Costa et al. |
| 2012/0202904 A1 | 8/2012 | Chen et al. |
| 2013/0041048 A1 | 2/2013 | Chen et al. |
| 2013/0149452 A1 | 6/2013 | Bogdan et al. |
| 2014/0005288 A1 | 1/2014 | Chen et al. |
| 2014/0051776 A1 | 2/2014 | Chen et al. |
| 2014/0178312 A1 | 6/2014 | Basu et al. |
| 2014/0346390 A1 | 11/2014 | Basu et al. |
| 2014/0357747 A1 | 12/2014 | Loh et al. |
| 2014/0371338 A1 | 12/2014 | Chen et al. |
| 2016/0130416 A1 | 5/2016 | Chen et al. |
| 2016/0200889 A1 | 7/2016 | Parenti et al. |
| 2016/0369077 A1 | 12/2016 | Hu et al. |
| 2017/0081491 A1 | 3/2017 | Chen et al. |
| 2017/0158801 A1 | 6/2017 | Rider et al. |
| 2018/0134861 A1 | 5/2018 | Schilling et al. |
| 2018/0265620 A1* | 9/2018 | Okada ............... C08G 18/4208 |
| 2018/0273671 A1* | 9/2018 | Guo ..................... C08G 18/42 |
| 2019/0322791 A1* | 10/2019 | Rider ................ C08G 18/4825 |
| 2019/0375878 A1* | 12/2019 | Singh ..................... C08J 9/141 |
| 2019/0389996 A1* | 12/2019 | Rolfsen ............. C08G 18/5069 |

FOREIGN PATENT DOCUMENTS

| | | | |
|---|---|---|---|
| CN | 104 530 360 A | 4/2015 | |
| CN | 104 530 361 A | 4/2015 | |
| CN | 104 628 978 A | 5/2015 | |
| CN | 104 672 420 A | 6/2015 | |
| CN | 104 672 426 A | 6/2015 | |
| CN | 105 038 182 A | 11/2015 | |
| CN | 105 601 978 A | 5/2016 | |
| CN | 105 985 503 A | 10/2016 | |
| CN | 106 496 494 A | 3/2017 | |

OTHER PUBLICATIONS

Bowman, James M.; "Cold Chain Industry: Energy Efficiency Solutions Solstice® LBA / Cyclopentane Blend Performance"; pp. 1-9; Honeywell International (Buffalo, NY) and Bayer de Mexico, S.A. de C.V. (Santa Clara, Mexico), presented at the CPI Technical Conference 2014.

Schilling, Steven L. et al; "Optimization of Polyurethane Rigid Foams Co-Blown with Cyclopentane and Halogenated Olefin Blowing Agents"; 2015 American Chemistry Council; Covestro LLC (Pittsburgh, PA).

Loh, Gary et al; "Formacel® 1100—a HFO with Unique Characteristics for Polyurethane Foam Applications"; 2014 American Chemistry Council; DuPont Fluorochemicals and DuPont Company (Wilmington, DE).

Thomaz, Geraldo L. et al; "Formacel® 1100 (FEA-1100), a Zero ODP and Low GWP Foam Expansion Agent for the Applicance Industry"; Whirlpool Corporation (Joinville SC Brazil), Dow Brazil Sudeste Industrial (Sao Paulo, SP Brazil), DuPont Company (Wilmington, DE) and DuPont Argentina SA (Buenos Aires, Argentina), presented at the CPI Technical Conference 2014.

Schilling, Steven et al; "Optimization of Polyurethane Rigid Foams Co-Blown with Cyclopentane and Halogenated Olefin Blowing Agents"; Polyurethanes Technical Conference—Oct. 5-7, 2015, Gaylord Palms Resort and Convention Center, Orlando, FL USA.

* cited by examiner

HCFO-CONTAINING ISOCYANATE-REACTIVE COMPOSITIONS, RELATED FOAM-FORMING COMPOSITIONS AND POLYURETHANE FOAMS

FIELD

This specification pertains generally to hydrochlorofluoroolefin ("HCFO")-containing isocyanate-reactive compositions, polyurethane foam-forming compositions containing such isocyanate-reactive compositions, rigid polyurethane foams made using such polyurethane foam-forming compositions, and methods for producing such foams, including use of such foams as insulation in the construction of refrigerated storage devices.

BACKGROUND

Rigid polyurethane foams are used in numerous industries. They are produced by reacting an appropriate polyisocyanate and an isocyanate-reactive compound, usually a polyol, in the presence of a blowing agent. One use of such foams is as a thermal insulation medium in the construction of refrigerated storage devices. The thermal insulating properties of closed-cell rigid foams are dependent upon a number of factors, including the average cell size and the thermal conductivity of the contents of the cells.

Chlorofluorocarbons (CFC's) and hydrogen-containing chlorofluorocarbons (HCFC's) have been used as blowing agents to produce these foams because of their exceptionally low vapor thermal conductivity. However, their ozone-depletion potential is a drawback to their use. Alternative blowing agents, such as hydrofluorocarbons (HFC's) are also used, but they are greenhouse gases. Hydrocarbons, such as pentane isomers, have also been used, but these are flammable and have lower energy efficiency. Halogenated hydroolefinic compounds, such as HCFOs, are now possible candidates as replacements for HFCs, since their chemical instability in the lower atmosphere provides for a low global warming potential and zero or near zero ozone depletion properties.

Formulations used to produce thermally insulating rigid polyurethane foam, particularly those used in the construction of refrigerated storage devices, utilize catalysts to control the relative rates of water-polyisocyanate (gas-forming or blowing) and polyol-polyisocyanate (gelling) reactions. In the gelling reaction, the isocyanate reacts with polyols to form the polyurethane foam matrix. In the blowing reaction, the isocyanate reacts with water in the formulation to form polyurea and carbon dioxide. While these reactions take place at different rates; it is necessary to properly balance them to produce high-quality foam. If the blowing reaction occurs faster than the gelling reaction, the gas generated by the reaction may expand before the polyurethane matrix is strong enough to contain it and foam collapse can occur. In contrast, if the gelling occurs faster than the blowing reaction, the foam cells will remain closed, causing the foam to shrink as it cools.

As a result, to achieve the proper balance, formulations utilize a combination of blow catalysts and gel catalysts. Amine catalysts, for example, are known to have a greater effect on the water-polyisocyanate blowing reaction, whereas organotin catalysts are known to have a greater effect on the polyol-polyisocyanate gelling reaction.

A drawback to at least some HCFOs as blowing agents in the production of satisfactory isocyanate-based foams is poor shelf-life. Blowing agents often are combined with polyols and other components, such as surfactant(s) and the catalyst(s), to form a so-called "B-side" pre-mix that may be stored for up to several months prior to being combined with an "A-side" isocyanate component to form the foam. With certain HCFOs, however, if the B-side composition is aged prior to combining with the polyisocyanate, the foam can be of lower quality and may even collapse during the formation of foam. The poor foam structure is thought to be attributable to the reaction of certain catalysts with these HCFOs which results in the partial decomposition of the blowing agent and, as a result, undesirable modification of silicone surfactants, resulting in poor foam structure and quality.

Foam-forming compositions used in the production of insulation for refrigerated storage devices must exhibit a stringent combination of properties. For example, in addition to good thermal insulation properties, they must exhibit a target gel time conducive to the manufacturing equipment and process that is used, and they must exhibit a long shelf life, which means that this gel time cannot change by a large amount after storage of the foam-forming composition components for a long period of time (several months or more), even when a chemical blowing agent, such as water, is also used. The isocyanate-reactive composition used must also be phase stable in that it does do not exhibit any significant phase separation over time. The foams also must exhibit good dimensional stability (low foam shrinkage) even when the free-rise foams have a relatively low density of less than 1.6 lb/ft$^3$.

A composition that can fulfill most, if not all, of these requirements, while utilizing a HCFO blowing agent and a combination of gel catalyst with blow catalyst would, therefore, before highly desirable.

SUMMARY

In certain respects, the present disclosure is directed to isocyanate-reactive compositions. These compositions comprise: (a) a polyol blend, (b) a blowing agent composition, and (c) a catalyst composition. The polyol blend comprises: (1) 20 to 50% by weight, based on the total weight of the polyol blend, of a saccharide initiated polyether polyol having an OH number of 200 to 600 mg KOH/g and a functionality of 4 to 6; (2) 40 to 55% by weight, based on the total weight of the polyol blend, of an aromatic polyether polyol having an OH number of 170 to 600 mg KOH/g and a functionality of 3 to 5; and (3) 10 to 25% by weight, based on the total weight of the polyol blend, of an aromatic polyester polyol having an OH number of 150 to 410 mg KOH/g and a functionality of 1.5 to 3. The blowing agent composition comprises: (1) a physical blowing agent comprising at least 10% by weight, based on the total weight of the isocyanate-reactive composition, of a HCFO; and (2) a carbon dioxide generating chemical blowing agent. The catalyst composition comprises: (1) a morpholine; (2) an imidazole; and (3) an organometallic compound, in which (i) the morpholine is present in an amount of 1.5 to 2.5 parts by weight per 1 part by weight of the combination of imidazole and organometallic compound that is present in the catalyst composition, and (ii) the imidazole is present in an amount of 1.5 to 2.5 parts by weight per 1 part by weight of organometallic compound that is present in the catalyst composition.

The present specification is also directed to polyurethane foam-forming compositions that include such isocyanate-reactive compositions, rigid polyurethane foams produced from polyurethane foam-forming compositions, methods for making such rigid foams, and composite articles comprising such rigid foams, and refrigerated storage devices that include such rigid foams.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of polyurethane foams, the hydroxyl groups react with isocyanate groups, —NCO, that are attached to the isocyanate compound. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1×1000)/OH number.

As indicated, certain embodiments of the present specification isocyanate-reactive compositions useful in the production of rigid foams. A rigid foam is characterized as having a ratio of compressive strength to tensile strength of at least 0.5:1, elongation of less than 10%, as well as a low recovery rate from distortion and a low elastic limit, as described in in "Polyurethanes: Chemistry and Technology, Part II Technology," J. H. Saunders & K. C. Frisch, Interscience Publishers, 1964, page 239.

The rigid foams are the reaction product of a polyurethane-foam forming composition that includes: (a) a diisocyanate and/or polyisocyanate; and (b) an isocyanate-reactive composition.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmeth-anediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

In certain embodiments, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent, due to their ability to cross-link the polyurethane.

The isocyanate-reactive composition described in this specification comprises a polyol blend. The polyol blend comprises a saccharide initiated polyether polyol. As used herein, "saccharide initiated polyether polyol" refers to a polyether polyol prepared by reacting at least one alkylene oxide with one or more suitable starter compounds in the presence of a suitable catalyst, in which the starter compounds comprise one or more saccharide initiators. Examples of suitable alkylene oxides include ethylene oxide, propylene oxide, butylene oxide, styrene oxide, epichlorohydrin, or mixtures thereof, etc. Some examples of suitable saccharide initiators are sucrose, sorbitol, maltitol, etc. as well as other mono-saccharides, di-saccharides, tri-saccharides and polysaccharides which are known to those of ordinary skill in the art. Other initiator compounds are often used in combination with the saccharide initiator to prepare the saccharide initiated polyether polyol. Saccharides can be co-initiated with for example, compounds such as water, propylene glycol, glycerin, ethylene glycol, ethanol amines, diethylene glycol, etc. and mixtures thereof. As will be appreciated, it is possible to use a wide variety of individual initiator compounds in combination with one another in which the functionality of the individual initiator compounds does not fall within the functionalities set forth herein, provided that the average functionality of the mixture of initiator compounds satisfies the overall functionality range disclosed herein.

Some examples of suitable catalysts which can be used include basic catalysts (such as sodium or potassium hydroxide or tertiary amines such as methyl imidazole), double metal cyanide (DMC) catalysts, etc.

In some embodiments, the saccharide, such as sucrose, is first reacted with ethylene oxide and then propylene oxide. In some cases, the ethylene oxide is used in an amount of 10 to 50%, such as from 20 to 40%, by weight of the total alkylene oxide used and the propylene oxide is used in an amount of from 50 to 90%, such as 60 to 80%, by weight of the total alkylene oxide used. In some implementations, the total amount of alkylene oxide used is selected so that the product has an average molecular weight of 300 to 1600, such as 440 to 1000.

In some embodiments, the saccharide initiated polyether polyol has an OH number of from 200 to 600 mg KOH/g, such as 300 to 550 mg KOH/g, such as 400 to 500 mg KOH/g, or, in some cases, 450 to 500 mg KOH/g, and a functionality of 4 to 6, such as 5 to 6, 5.2 to 5.8, or 5.4 to 5.6.

In some embodiments, the saccharide-initiated polyether polyol is utilized in an amount of 20 to 50% by weight, 30 to 50% by weight, such as 35 to 45% by weight, or 38 to 42% by weight, based on the total weight of the polyol blend.

The polyol blend further comprises an aromatic polyether polyol. Such aromatic polyether polyols can be prepared using, for example, an aromatic amine, a Mannich base having an aromatic ring, or a polyfunctional phenol as the starting material.

In the case of the aromatic polyether polyol being produced by using an aromatic amine as a starting material, such a polyether polyol can be prepared by the reaction of a mixture comprising one or more alkylene oxides with one or more aromatic amine compounds in the presence of one or more suitable catalysts. Examples of suitable alkylene oxides include ethylene oxide, propylene oxide, butylene oxide, styrene oxide, epichlorohydrin, etc. Some examples of suitable aromatic amines include 2,3-toluene diamine, 3,4-toluene diamine, 2,4-toluene diamine, and 2,6-toluene diamine or mixtures thereof, 4,4'-methylene dianiline, methylene-bridged polyphenyl polyamines composed of isomers of methylene dianilines and triamines or polyamines of higher molecular weight prepared by reacting aniline with formaldehyde. Typically, two hydroxyl groups are formed for each primary amine group that is alkoxylated, so that a diamine, such as toluene diamine would react with ethylene or propylene oxide to form a polyol with a nominal functionality of 4. Suitable catalysts for preparing the aromatic amine initiated polyether polyols include basic catalysts (hydroxides, tertiary amines), DMC (double metal cyanide) catalysts, etc.

In some embodiments, the aromatic amine initiated polyether polyol is obtained by ring-opening addition polymerization of propylene oxide and ethylene oxide with an aromatic amine compound that has an ethylene oxide content of 30 to 85 mass %, such as 35 wt % to 80 wt %, of the total amount of the alkylene oxides.

Aromatic polyether polyols produced by using a Mannich base as a starting material are often prepared by adding an alkylene oxide, such as any of those mentioned earlier with respect to the aromatic amine initiated polyether polyols, to a Mannich reduction product that can, for example, be obtained in reaction of a phenol, an aldehyde, and an alkanolamine. Examples of the phenol include phenol, nonylphenol, cresol, bisphenol A, resorcinol, and the like. Examples of the aldehyde include formaldehyde, paraformaldehyde, and the like. Examples of the alkanolamine include monoethanolamine, diethanolamine, triethanolamine, 1-amino-2-propanol, aminoethylethanolamine, and the like. In producing the Mannich compound, the rates of the raw materials are sometimes as follows: 1 mole of a phenol, 1.5 to 2.0 moles of an aldehyde and 2.3 to 3.0 moles of an alkanolamine.

Aromatic polyether polyol produced by using a polyfunctional phenol as the starting material include resol type condensates prepared by condensing phenols with excess formaldehydes in the presence of an alkaline catalyst, a benzylic ether-type initial condensate prepared by reacting in a non-aqueous system in case of synthesizing the resol type condensate, and a novolak-type condensate prepared by reacting excess phenols with formaldehydes in the presence of an acid catalyst.

In some embodiments, the aromatic polyether polyol has an OH number of 170 to 600 mg KOH/g, such as 250 to 500 mg KOH/g, such as 300 to 450 mg KOH/g, or, in some cases, 340 to 420 mg KOH/g, and a functionality of 3 to 5, such as 3.5 to 4.5, or 4.

In some embodiments, the aromatic polyether polyol is utilized in an amount of 40 to 55% by weight, 40 to 50% by weight, such as 42 to 48% by weight, or 43 to 47% by weight, based on the total weight of the polyol blend.

In certain embodiments, the aromatic polyether polyol and the saccharide-initiated polyether polyol are present in the polyol blend in a weight ratio of at least 1:1, such as 1:1 to 2:1, 1:1 to 1.5:1, or, in some cases 1:1 to 1.2:1.

The polyol blend further comprises an aromatic polyester polyol. Suitable aromatic polyester polyols include, for example, the reaction product of an aromatic diacid or anhydride with a suitable glycol or triol. For example, polyester polyols can be the reaction product of a glycol and/or triol, such as ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture of any two or more thereof with an aromatic diacid or aromatic anhydride, such as, for example, phthalic acid, isophthalic acid, terephthalic acid, or phthalic anhydride. Some of examples of the suitable aromatic polyester polyols include those compounds which are available from Stepan Chemical under the Stepanpol trade name such as, for example, Stepanpol® PS 3024 and Stepanpol PS 2502A or from Invista under the Terate trade name, such as Terate® HT5100, or from Coim under the Isoexter trade name such as Isoexter® TB-265.

In certain embodiments, the aromatic polyester polyol has an OH number of 150 to 410 mg KOH/g, such as 150 to 360 mg KOH/g, such as 200 to 335 mg KOH/g, or, in some cases, 200 to 225 mg KOH/g, and a functionality of 1.5 to 3, such as 1.9 to 2.5.

In some embodiments, the aromatic polyester polyol is utilized in an amount of 10 to 25%, such as 10 to 18% by weight, based upon the total weight of the polyol blend.

In certain embodiments, the saccharide-initiated polyether polyol and the aromatic polyester polyol are present in the polyol blend in a weight ratio of at least 2:1, such as 2:1 to 3:1, or, in some cases 2.5:1 to 3:1. In certain embodiments, the aromatic polyether polyol and the aromatic polyester polyol are present in the polyol blend in a weight ratio of at least 2:1, such as 2:1 to 4:1, 2.5:1 to 3.5:1, or, in some cases 2.8:1 to 3.2:1, or, in some cases, 2.9:1 to 3.1:1.

If desired, the polyol blend may include additional compounds that contain isocyanate-reactive groups, such as chain extenders and/or crosslinking agents, and higher molecular weight polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, diethyltoluenediamine, etc. Polyester polyols may be prepared from, for example, an organic dicarboxylic acid having 2 to 12 carbon atoms, such as an aliphatic dicarboxylic acid having 4 to 6 carbon atoms, and a polyvalent alcohol, such as a diol or triol having 2 to 12 carbon atoms. Examples of the dicarboxylic acid are succinic acid, glutaric acid, adipic acid, suberic acid, azelaic acid, sebacic acid, decanedicarboxylic acid, maleic acid, fumaric acid, phthalic acid, isophthalic acid and terephthalic acid. Instead of a free dicarboxylic acid, a corresponding dicarboxylic acid derivative such as a dicarboxylic acid monoester or diester prepared by esterification with an alcohol having 1 to 4 carbon atoms or dicarboxylic anhydride can be used.

In certain embodiments, the polyol blend has a weighted average functionality of from 3 to 5, such as 3.5 to 4.5 or 4.0 to 4.5, and/or a weighted average hydroxyl number of from 300 to 500 mg KOH/g, such as 350 to 450 mg KOH/g, or 380 to 420 mg KOH/g.

In certain embodiments, the polyol blend comprises less than 20% by weight of the aromatic polyester polyol and/or the polyol blend comprises less than 25% by weight of ethylene oxide, based on the total weight of the saccharide initiated polyether polyol and the aromatic polyether polyol in the polyol blend.

As indicated, the isocyanate-reactive composition of this specification further comprises a blowing agent composition. The blowing agent composition comprises: (1) a physical blowing agent comprising at least 10% by weight, based on the total weight of the isocyanate-reactive composition, of a HCFO; and (2) a carbon dioxide generating chemical blowing agent.

Suitable HCFOs include 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers). In some embodiments, the boiling point, at atmospheric pressure, of the HCFO is at least −25° C., at least −20° C., or, in some cases, at least −19° C., and 40° C. or less, such as 35° C. or less, or, in some cases 33° C. or less. The HCFO may have a boiling point, at atmospheric pressure, of, for example, −25° C. to 40° C., or −20° C. to 35° C., or −19° C. to 33° C.

As indicated, in some embodiments, the HCFO is utilized in an amount of at least 10% by weight, at least 15% by weight, such as at least 18% by weight, or, in some cases, at least 20% by weight, such as 15 to 30% by weight, 18 to 30% by weight, or 20 to 30% by weight, based on the total weight of the isocyanate-reactive composition.

In certain embodiments, the isocyanate-reactive composition is substantially or, in some cases, completely free of other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane), etc. As used herein, the term "substantially free" when used with reference to these blowing agents, means that the blowing agent is present, if at all, in an amount of less than 10% by weight, such as less than 1% by weight, based on the total weight of the blowing agent composition.

As indicated above, the isocyanate-reactive composition comprises a carbon dioxide generating chemical blowing agent, such as water and/or formate-blocked amines. In some of these embodiments, the carbon dioxide generating chemical blowing agent, such as water, is utilized in an amount of from 0.5 to 5.0% by weight, such as 1 to 4% by weight, or 1.0 to 3.0% by weight, or 1.0 to 2.0% by weight, based on the total weight of the isocyanate-reactive composition.

In certain embodiments, the blowing agent composition comprises HCFO and a carbon dioxide generating chemical blowing agent, such as water, wherein the HCFO and the carbon dioxide generating chemical blowing agent are present in an amount of at least 90% by weight, such as at least 95% by weight, or, in some cases, at least 99% by weight, based on the total weight of the blowing agent composition. In certain embodiments, the HCFO and a carbon dioxide generating chemical blowing agent are present in the blowing agent composition at a weight ratio of at least 10:1, such as at least 20:1, or, in some cases, at least 25:1, such as 10:1 to 50:1 or 20:1 to 30:1.

If desired, the blowing agent composition may include other physical blowing agents, such as (a) other hydrofluoroolefins (HFOs), such as pentafluoropropane, tetrafluoropropene, 2,3,3,3-tetrafluoropropene, 1,2,3,3-tetrafluoropropene, trifluoropropene, tetrafluorobutene, pentafluorobutene, hexafluorobutene, heptafluorobutene, heptafluoropentene, octafluoropentene, and nonafluoropentene; (b) hydrofluorocarbons (c) hydrocarbons, such as any of the pentane isomers and butane isomers; (d) hydrofluoroethers (HFEs); (e) $C_1$ to $C_5$ alcohols, $C_1$ to $C_4$ aldehydes, $C_1$ to $C_4$ ketones, $C_1$ to $C_4$ ethers and diethers and carbon dioxide. Specific examples of such blowing agents are described in United States Patent Application Publication No. US 2014/0371338 A1 at [0051] and [0053], the cited portion of which being incorporated herein by reference.

In some implementations, the isocyanate-reactive composition also comprises a surfactant. Any suitable surfactant can be used, including organosilicon compounds, such as polysiloxane-polyalkyene-block copolymers, such as a polyether-modified polysiloxane. Other useful surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. In some embodiments, surfactant is utilized in an amount of 0.2 to 5.0% by weight, such as 1 to 3% by weight, based on the total weight of the isocyanate-reactive composition.

As indicated earlier, the isocyanate-reactive composition further comprises a catalyst composition. The catalyst composition comprises a morpholine, an imidazole, and an organometallic compound. Suitable morpholine catalysts include, for example, dimorpholinodiethylether, dimorpholinodimethylether N-ethylmorpholine, and N-methylmorpholine. Suitable imidazole catalysts include, for example, imidazole, n-methylimidazole, and 1,2-dimethylimidazole. Suitable organometallic compounds include dibutyltin dilaurate, dibutyltin diacetate, stannous octoate, potassium octoate, potassium acetate, and potassium lactate.

In the isocyanate-reactive compositions of this specification, the morpholine is present in an amount of 1.5 to 2.5 parts by weight per 1 part by weight of the combination of imidazole and organometallic compound that is present in the catalyst composition, and (ii) the imidazole is present in an amount of 1.5 to 2.5 parts by weight per 1 part by weight of organometallic compound that is present in the catalyst composition In some implementations of the isocyanate-reactive compositions of the present specification, the catalyst composition is present in an amount of 2 to 10% by weight, such as 3 to 7% by weight, or 4 to 6% by weight based on the total weight of the isocyanate-reactive composition. In addition, in some implementations of the isocyanate-reactive composition of this specification, (i) the morpholine is present in an amount of 40 to 85% by weight, such as 50 to 80% by weight or, in some cases, 60 to 70% by weight, based on the total weight of the catalyst composition, (ii) the imidazole is present in an amount of 10 to 30% by weight, such as 15 to 25% by weight, or, in some cases 20 to 25% by weight, based on the total weight of the catalyst composition, and (iii) the organometallic compound is present in an amount of 5 to 30% by weight, such as 5 to 15% by weight, or, in some cases, 10 to 15% by weight, based on the total weight of the catalyst composition.

In certain embodiments, the catalyst composition does not include an acid-blocked amine catalyst or any other catalyst aside from the morpholine, imidazole, and organometallic compound. Thus, in some implementations, the morpholine, imidazole, and organometallic compound constitute at least 90% by weight, such as at least 95% by weight, or, in some cases, at least 99% by weight, of the total weight of the catalyst composition.

Additional materials which may optionally be included in the foam-forming compositions of the present invention include: pigments, colorants, fillers, antioxidants, flame retardants, and stabilizers. Exemplary flame retardants useful in the foam-forming composition of the present invention include, but are not limited to, reactive bromine based compounds known to be used in polyurethane chemistry and chlorinated phosphate esters, including but not limited to, tri(2-chloroethyl)phosphate (TECP), tri(1,3-dichloro-2-propyl)phosphate, tri(1-chloro-2-propyl)phosphate (TCPP) and dimethyl propyl phosphate (DMPP).

The present specification is also directed to processes for producing rigid polyurethane foams. In such processes, an organic isocyanate is reacted with an isocyanate-reactive composition of the type described above. In some embodiments, the isocyanate functional component and the isocyanate-reactive composition are mixed at an isocyanate index of from 90 to 140, such as 120 to 130.

In certain embodiments, the polyol blend of the isocyanate-reactive composition is reacted with an organic polyisocyanate in the presence of the blowing agent composition, the catalyst composition, a surfactant and any other optional ingredients. The rigid foams may be prepared by blending all of the components of the isocyanate reactive composition together in a phase stable mixture, and then mixing this in the proper ratio with the organic polyisocyanate. Alternatively, one or more of the components, such as the surfactant, may be combined with the organic polyisocyanate prior to mixing it with the isocyanate reactive component. Other possible embodiments would include adding one or more of the components as a separate stream, together with the isocyanate reactive component and organic polyisocyanate. As used herein, the term phase stable means that the isocyanate-reactive composition will not separate when stored for 7 days at about 70° F. (or 21° C.).

Many foam machines are designed to condition and mix only two components in the proper ratio. For use of these machines, a premix of all the components except the polyisocyanate can be advantageously employed. According to the two-component method (component A: polyisocyanate; and component B: isocyanate-reactive composition which typically includes the polyol blend, blowing agent, water, catalyst and surfactant), the components may be mixed in the proper ratio at a temperature of 5 to 50° C., such as 15 to 35° C., injected or poured into a mold having the temperature controlled to within a range of from 20 to 70°

C., such as 35 to 60° C. The mixture then expands to fill the cavity with the rigid polyurethane foam. This simplifies the metering and mixing of the reacting components which form the polyurethane foam-forming mixture, but requires that the isocyanate reactive composition be phase stable.

Alternatively, the rigid polyurethane foams may also be prepared by the so-called "quasi prepolymer" method. In this method, a portion of the polyol component is reacted in the absence of the urethane-forming catalysts with the polyisocyanate component in proportion so as to provide from 10 percent to 35 percent of free isocyanate groups in the reaction product based on the prepolymer. To prepare foam, the remaining portion of the polyol is added and the components are allowed to react together in the presence of the blowing agent and other appropriate additives such as the catalysts, surfactants, water, etc. Other additives may be added to either the isocyanate prepolymer or remaining polyol or both prior to the mixing of the components, whereby at the end of the reaction, rigid polyurethane foam is provided.

Furthermore, the rigid polyurethane foam can be prepared in a batch or continuous process by the one-shot or quasi-prepolymer methods using any well-known foaming apparatus. The rigid polyurethane foam may be produced in the form of slab stock, moldings, cavity fillings, sprayed foam, frothed foam or laminates with other materials such as hardboard, plasterboard, plastics, paper or metal as facer substrates.

For closed-cell insulating foams, the object is to retain the blowing agent in the cells to maintain a low thermal conductivity of the insulating material, i.e., the rigid polyurethane foam. Thus, high closed-cell content in the foam is desirable. Foams produced according to embodiments of the present specification have more than 80 percent, typically more than 85 percent, or more than 88 percent closed-cell content as measured according to ASTM D6226-15. Furthermore, the thermal conductivity of foams produced according to various embodiments of the present specification indicates that the foams have acceptable insulating properties, i.e., the foams have a thermal conductivity measured at 35° F. (2° C.) of less than 0.126 BTU-in/h-ft$^2$-° F. and measured at 75° F. (24° C.) of less than 0.142 BTU-in/h-ft$^2$-° F. for foam from the core of 2-inch thick panels, as measured according to ASTM C518-15.

This specification also relates to the use of the rigid polyurethane foams described herein for thermal insulation. That is, the rigid polyurethane foams of the present specification may find use as an insulating material in refrigeration apparatuses since the combination of good thermal insulation and other properties described herein is particularly appropriate here. The rigid foams according to the invention can be used, for example, as an intermediate layer in composite elements or for filling hollow spaces of refrigerators and freezers, or refrigerated trailers. The inventive foams may also find use in the construction industry or for thermal insulation of long-distance heating pipes and containers.

As such, the present invention also provides a composite article comprising rigid polyurethane foam as disclosed herein sandwiched between one or more facer substrates. In certain embodiments, the facer substrate may be plastic (such a polypropylene resin reinforced with continuous bi-directional glass fibers or a fiberglass reinforced polyester copolymer), paper, wood, or metal. For example, in certain embodiments, the composite article may be a refrigeration apparatus such as a refrigerator, freezer, or cooler with an exterior metal shell and interior plastic liner. In certain embodiments, the refrigeration apparatus may be a trailer, and the composite article may include the polyurethane foams produced according to the present invention in sandwich composites for trailer floors.

It has been found, surprisingly, that the particular isocyanate-reactive compositions described herein are capable of producing rigid foams that have a particular combination of properties that make them suitable for use in refrigerated storage devices, such as refrigerators and freezers.

First, the rigid foams can have a thermal conductivity measured at 75° F. (24° C.) of less than 0.142 BTU-in/h-ft$^2$-° F., such as less than 0.135 BTU-in/h-ft$^2$-° F. or even less than 0.130 BTU-in/h-ft$^2$-° F. for foam from the core of 2-inch thick panels, as measured according to ASTM C518-15 at a core foam density of 1.8 to 2.0 lb/ft$^3$ (28.8 to 32.0 kg/m$^3$). Second, the isocyanate-reactive composition is phase stable and has a long shelf life. Here, when it is stated that the isocyanate-reactive composition has a "long" shelf life it means that after storing the isocyanate-reactive composition for 6 days (144 hours) at 60° C., when the isocyanate-reactive composition is combined with the polyisocyanate, both (a) the gel time of the foam produced thereby remains within 10% of the initial gel time (the gel time of such a foam if produced immediately and not after storing the isocyanate-reactive composition for 6 days (144 hours) at 60° C.) and (b) the free rise density foam produced thereby remains within 0.05 lb/ft$^3$ of the initial free rise density (the free rise density of such a foam is produced immediately and not after storing the isocyanate-reaction composition for 6 days (144 hours) at 60° C.), even in cases where the isocyanate-reactive composition comprises 1% by weight of water and 25% by weight HCFO, based on the total weight of the isocyanate-reactive composition. In some cases, this initial gel time is 75 seconds, ±15 seconds, which can be ideally suited for certain refrigerator applications. Third, it was determined that the density and gel time for the foams could match that of a similar comparative formulation utilizing a hydrofluorocarbon blowing agent (HFC245fa) by simply slightly increasing the temperature of the isocyanate and isocyanate-reactive composition during application.

Various aspects of the subject matter described herein are set out in the following numbered clauses:

Clause 1. An isocyanate-reactive composition, comprising: (a) a polyol blend comprising, based on the total weight of the polyol blend: (1) 20 to 50% by weight of a saccharide initiated polyether polyol having an OH number of 200 to 600 mg KOH/g and a functionality of 4 to 6; (2) 40 to 55% by weight of an aromatic polyether polyol having an OH number of 170 to 600 mg KOH/g and a functionality of 3 to 5; and (3) 10 to 25% by weight of an aromatic polyester polyol having an OH number of 150 to 410 mg KOH/g and a functionality of 1.5 to 3; (b) a blowing agent composition comprising: (1) a physical blowing agent comprising at least 10% by weight, based on the total weight of the isocyanate-reactive composition, of a HCFO; and (2) a carbon dioxide generating chemical blowing agent; and (c) a catalyst composition comprising: (1) a morpholine; (2) an imidazole; and (3) an organometallic compound, wherein the morpholine is present in an amount of 1.5 to 2.5 parts by weight per 1 part by weight of the combination of imidazole and organometallic compound and the imidazole and organometallic compound are present in a weight ratio of 1.5 to 2.5:1.

Clause 2. The isocyanate-reactive composition of Clause 1, wherein the saccharide initiated polyether polyol has an OH number of 300 to 550 mg KOH/g, 350 to 450 mg KOH/g, or 398 to 422 mg KOH/g.

Clause 3. The isocyanate-reactive composition of Clause 1 or Clause 2, wherein the saccharide initiated polyether polyol has a functionality of 5 to 6, 5.2 to 5.8, or 5.4 to 5.6.

Clause 4. The isocyanate-reactive composition of one of Clause 1 to Clause 3, wherein the saccharide-initiated polyether polyol is present in an amount of 30 to 50% by weight, 35 to 45% by weight, or 38 to 42% by weight, based on the total weight of the polyol blend.

Clause 5. The isocyanate-reactive composition of one of Clause 1 to Clause 4, wherein the aromatic polyether polyol comprises (a) an aromatic amine-initiated polyether polyol, such as an aromatic amine initiated polyether polyol obtained by ring-opening addition polymerization of propylene oxide and ethylene oxide with an aromatic amine compound that has an ethylene oxide content of 30 to 85 mass %, such as 35 wt % to 80 wt %, of the total amount of the alkylene oxides; (b) a Mannich base-initiated polyether polyol, such as those prepared by adding an alkylene oxide, such as propylene oxide and/or ethylene oxide, to a Mannich reduction product, such as that obtained in reaction of a phenol, an aldehyde, and an alkanolamine, and/or (c) a polyfunctional phenol-initiated polyether polyol.

Clause 6. The isocyanate-reactive composition of one of Clause 1 to Clause 5, wherein the aromatic polyether polyol has an OH number of 250 to 500 mg KOH/g, such as 300 to 450 mg KOH/g, or 340 to 420 mg KOH/g.

Clause 7. The isocyanate-reactive composition of one of Clause 1 to Clause 6, wherein the aromatic polyether polyol has a functionality of 3.5 to 4.5 or 4.

Clause 8. The isocyanate-reactive composition of one of Clause 1 to Clause 7, wherein the aromatic polyether polyol is utilized in an amount of 40 to 50% by weight, such as 42 to 48% by weight, or 43 to 47% by weight, based on the total weight of the polyol blend.

Clause 9. The isocyanate-reactive composition of one of Clause 1 to Clause 8, wherein the aromatic polyether polyol and the saccharide-initiated polyether polyol are present in the polyol blend in a weight ratio of at least 1:1, such as 1:1 to 2:1, 1:1 to 1.5:1, or, in some cases 1:1 to 1.2:1.

Clause 10. The isocyanate-reactive composition of one of Clause 1 to Clause 9, wherein the aromatic polyester polyol has an OH number of 150 to 360 mg KOH/g, such as 200 to 335 mg KOH/g, or, in some cases, 200 to 225 mg KOH/g.

Clause 11. The isocyanate-reactive composition of one of Clause 1 to Clause 10, wherein the aromatic polyester polyol has a functionality of 1.9 to 2.5.

Clause 12. The isocyanate-reactive composition of one of Clause 1 to Clause 11, wherein the aromatic polyester polyol is present in an amount of 10 to 18% by weight, based upon the total weight of the polyol blend.

Clause 13. The isocyanate-reactive composition of one of Clause 1 to Clause 12, wherein the saccharide-initiated polyether polyol and the aromatic polyester polyol are present in the polyol blend in a weight ratio of at least 2:1, such as 2:1 to 3:1, or, in some cases 2.5:1 to 3:1.

Clause 14. The isocyanate-reactive composition of one of Clause 1 to Clause 13, wherein the aromatic polyether polyol and the aromatic polyester polyol are present in the polyol blend in a weight ratio of at least 2:1, such as 2:1 to 4:1, 2.5:1 to 3.5:1, or, in some cases 2.8:1 to 3.2:1, or, in some cases, 2.9:1 to 3.1:1.

Clause 15. The isocyanate-reactive composition of one of Clause 1 to Clause 14, wherein the polyol blend has a weighted average functionality of from 3 to 5, such as 3.5 to 4.5 or 4.0 to 4.5, and/or a weighted average hydroxyl number of from 300 to 500 mg KOH/g, such as 350 to 450 mg KOH/g, or 380 to 420 mg KOH/g.

Clause 16. The isocyanate-reactive composition of one of Clause 1 to Clause 15, wherein the polyol blend comprises less than 20% by weight of the aromatic polyester polyol and/or the polyol blend comprises less than 25% by weight of ethylene oxide, based on the total weight of the saccharide initiated polyether polyol and the aromatic polyether polyol in the polyol blend.

Clause 17. The isocyanate-reactive composition of one of Clause 1 to Clause 16, wherein the HCFO comprises 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), and/or 2-chloro-1,1,1,3,4,4,4-heptafluorobutene-2 (E and/or Z isomers).

Clause 18. The isocyanate-reactive composition of one of Clause 1 to Clause 17, wherein the boiling point, at atmospheric pressure, of the HCFO is at least −25° C., at least −20° C., or at least −19° C., and 40° C. or less, 35° C. or less, or 33° C. or less, such as where the HCFO has a boiling point, at atmospheric pressure, of −25° C. to 40° C., −20° C. to 35° C., or −9° C. to 33° C.

Clause 19. The isocyanate-reactive composition of one of Clause 1 to Clause 18, wherein the HCFO is present in an amount of at least 15% by weight, at least 18% by weight, or at least 20% by weight, such as where the HCFO is present in an amount of 15 to 30% by weight, 18 to 30% by weight, or 20 to 30% by weight, based on the total weight of the isocyanate-reactive composition.

Clause 20. The isocyanate-reactive composition of one of Clause 1 to Clause 19, wherein the isocyanate-reactive composition is substantially or, in some cases, completely free of other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane).

Clause 21. The isocyanate-reactive composition of one of Clause 1 to Clause 20, wherein the carbon dioxide generating chemical blowing agent comprises water and/or a formate-blocked amine.

Clause 22. The isocyanate-reactive composition of one of Clause 1 to Clause 21, wherein the carbon dioxide generating chemical blowing agent is present in an amount of 0.5 to 5.0% by weight, 1 to 4% by weight, 1.0 to 3.0% by weight, or 1.0 to 2.0% by weight, based on the total weight of the isocyanate-reactive composition.

Clause 23. The isocyanate-reactive composition of one of Clause 1 to Clause 22, wherein the HCFO and the carbon dioxide generating chemical blowing agent are present in an amount of at least 90% by weight, at least 95% by weight, or at least 99% by weight, based on the total weight of the blowing agent composition.

Clause 24. The isocyanate-reactive composition of one of Clause 1 to Clause 23, wherein the HCFO and a carbon dioxide generating chemical blowing agent are present in the blowing agent composition at a weight ratio of at least 10:1, at least 20:1, or at least 25:1, such as 10:1 to 50:1 or 20:1 to 30:1.

Clause 25. The isocyanate-reactive composition of one of Clause 1 to Clause 24, wherein the blowing agent composition further comprises (a) an HFO, (b) a hydrofluorocarbon, (c) a hydrocarbon; (d) a hydrofluoroether; (e) a $C_1$ to $C_5$ alcohol, (f) a $C_1$ to $C_4$ aldehyde, (g) a $C_1$ to $C_4$ ketone, (h) a $C_1$ to $C_4$ ether or diether, and/or (i) carbon dioxide.

Clause 26. The isocyanate-reactive composition of one of Clause 1 to Clause 25, wherein the isocyanate-reactive composition further a surfactant, such as a polysiloxane-polyalkyene-block copolymer, such as a polyether-modified polysiloxane, a polyethylene glycol ether of a long chain alcohol, a tertiary amine or alkanolamine salt of a long chain alkyl acid sulfate ester, an alkylsulfonic ester, or an alkylarylsulfonic acid.

Clause 27. The isocyanate-reactive composition of one of Clause 1 to Clause 26, wherein the morpholine catalyst comprises dimorpholinodiethylether, dimorpholinodimethylether N-ethylmorpholine, and/or N-methylmorpholine.

Clause 28. The isocyanate-reactive composition of one of Clause 1 to Clause 27, wherein the imidazole catalyst comprises imidazole, n-methylimidazole, and/or 1,2-dimethylimidazole.

Clause 29. The isocyanate-reactive composition of one of Clause 1 to Clause 28, wherein the organometallic compound comprises dibutyltin dilaurate, dibutyltin diacetate, stannous octoate, potassium octoate, potassium acetate, and/or potassium lactate.

Clause 30. The isocyanate-reactive composition of one of Clause 1 to Clause 29, wherein the morpholine is present in an amount of 40 to 85% by weight, 50 to 80% by weight or 60 to 70% by weight, based on the total weight of the catalyst composition.

Clause 31. The isocyanate-reactive composition of one of Clause 1 to Clause 30, wherein the imidazole is present in an amount of 10 to 30% by weight, 15 to 25% by weight, or 20 to 25% by weight, based on the total weight of the catalyst composition.

Clause 32. The isocyanate-reactive composition of one of Clause 1 to Clause 31, wherein the organometallic compound is present in an amount of 5 to 30% by weight, 5 to 15% by weight, or 10 to 15% by weight, based on the total weight of the catalyst composition.

Clause 33. The isocyanate-reactive composition of one of Clause 1 to Clause 32, wherein the catalyst composition does not include an acid-blocked amine catalyst or any other catalyst aside from the morpholine, imidazole, and organometallic compound.

Clause 34. The isocyanate-reactive composition of one of Clause 1 to Clause 33, wherein the morpholine, imidazole, and organometallic compound constitute at least 90% by weight, at least 95% by weight, or at least 99% by weight of the total weight of the catalyst composition.

Clause 35. The isocyanate-reactive composition of one of Clause 1 to Clause 34, further comprising a pigments, colorant, filler, antioxidant, flame retardant, and/or a stabilizer.

Clause 36. A process for producing a rigid polyurethane foam, comprising mixing an isocyanate functional component and the isocyanate-reactive composition of one of Clause 1 to Clause 35, at an isocyanate index of from 90 to 140, such as 120 to 130.

Clause 37. The process of Clause 36, wherein the rigid polyurethane foam has a closed-cell content of more than 80 percent, more than 85 percent, or more than 88 percent, as measured according to ASTM D6226-15 and/or a thermal conductivity measured at 35° F. (2° C.) of less than 0.126 BTU-in/h-ft²-° F. and measured at 75° F. (24° C.) of less than 0.142 BTU-in/h-ft²-° F. for foam from the core of 2-inch thick panels, as measured according to ASTM C518-15.

Clause 38. A method comprising filling the hollow space of a refrigerator or freezers with a rigid polyurethane foam produced by a process of one of Clause 36 and Clause 37.

The non-limiting and non-exhaustive examples that follow are intended to further describe various non-limiting and non-exhaustive embodiments without restricting the scope of the embodiments described in this specification.

EXAMPLES

Example 1

Foam-forming compositions were prepared using the ingredients and amounts (in parts by weight) set forth in Table 1. The following materials were used:

POLYOL 1: an aromatic amine initiated polyether polyol having an OH number of about 390 mg KOH/g and a nominal functionality of 4, prepared by ethoxylating and then propoxylating a mixture of 2,3-toluene diamine and 3,4-toluene diamine, with ethylene oxide making up 29% of the polyol;

POLYOL 2: a sucrose-initiated polyether polyol having an OH number of about 470 mg KOH/g and a functionality of about 5.5, prepared by ethoxylating and then propoxylating a mixture of sucrose, propylene glycol, and water, with ethylene oxide making up 20% of the polyol;

POLYOL 3: an aromatic polyester polyol having an OH number of about 240 mg KOH/g and a functionality of 2, commercially available from Stepan Company as Stepanpol® PS-2502-A;

SURFACTANT: a silicon surfactant commercially available from Air Products and Chemicals, Inc. under the trade name Dabco® DC-5357.

CATALYST A: pentamethyldiethylenetriamine which is a tertiary amine urea (blow) catalyst commercially available from Air Products and Chemicals, Inc. under the trade name Polycat® 5;

CATALYST B: 1,3,5-tris(3-(dimethylamino)propyl)-hexahydro-s-triazine which is a tertiary amine isocyanurate (trimer) catalyst commercially available from Air Products and Chemicals, Inc. under the trade name Polycat® 41;

CATALYST C: 2,2'-dimorpholinodiethylether (JEFFCAT® DMDEE from Huntsman);

CATALYST D: 1,2-dimethylimidazole (DABCO® 2040 from Evonik);

CATALYST E: a solution of potassium-octoate in diethylene glycol (DABCO® K-15 from Air Products and Chemicals, Inc.);

CATALYST F: N,N-dimethylcyclohexylamine (Polycat® 8 from Air Products and Chemicals, Inc.);

HCFO 1233zd(E): trans-1,1,1-trifluoro-3-chloropropene, a hydrochlorofluoro olefin blowing agent which has a boiling point of 19° C.;

HFC 245fa: 1,1,1,3,3-pentafluoropropane;

ISOCYANATE: a polymeric diphenylmethane diisocyanate (PMDI) prepolymer with a NCO content of about 30.4%, a functionality of about 2.8, and a viscosity of about 350 centipoise at 25° C.

In each case, a master batch was prepared by mixing the polyols, catalysts, surfactant, water and blowing agents in the amounts indicated in Table 1. Foams were prepared by mixing the masterbatch with the amount of isocyanate indicated in Table 1 and pouring the mixture into an 83 ounce paper cup. The gel time and free rise density ("FRD") were recorded. Foams were prepared after initially preparing the master batch and also after aging the master batches for various amounts of time at 60° C. to assess shelf life. Results are set forth in Table 1. Examples 1A-1E are comparative examples and Example 1F is an inventive example.

TABLE 1

| Material | 1A | 1B | 1C | 1D | 1E | 1F |
|---|---|---|---|---|---|---|
| POLYOL 1 | 38.74 | 31.16 | 30.72 | 30.96 | 30.84 | 29.70 |
| POLYOL 2 | 17.61 | 27.70 | 27.30 | 27.52 | 27.42 | 26.40 |
| POLYOL 3 | 14.09 | 10.39 | 10.24 | 10.32 | 10.28 | 9.90 |
| SURFACTANT | 2.83 | 2.91 | 2.91 | 2.91 | 2.91 | 2.91 |
| CATALYST A | 0.71 | 0.76 | 1.07 | 0.80 | — | — |
| CATALYST B | — | — | 1.07 | 0.80 | — | — |
| CATALYST C | 0.35 | 0.38 | — | — | — | 0.49 |
| CATALYST D | — | — | — | — | — | 0.98 |
| CATALYST E | — | — | — | — | — | 2.93 |
| CATALYST F | — | — | — | — | 1.86 | — |
| Water | 0.90 | 0.96 | 0.96 | 0.96 | 0.96 | 0.96 |
| HFC 245fa | 24.76 | — | — | — | — | — |
| HCFO 1233zd(E) | — | 25.73 | 25.73 | 25.73 | 25.73 | 25.73 |
| Total | 100.0 | 100.0 | 100.0 | 100.0 | 100.00 | 100.00 |
| ISOCYANATE | 98.2 | 106 | 106 | 106 | 106 | 106 |
| Aging Temp (° C.) | 60 | 60 | 60 | 60 | 60 | 60 |

| Aging Period | Gel Time (seconds)/FRD (lb/ft$^3$) | | | | | |
|---|---|---|---|---|---|---|
| None | 72/1.55 | 84/1.62 | 64/1.55 | 82/1.57 | 67/1.57 | 76/1.56 |
| 1 day | —/— | 91/1.66 | 66/1.58 | 82/1.61 | —/— | —/— |
| 2 days | | 106/1.66 | 66/1.66 | 85/1.61 | —/— | —/— |
| 3 days | —/— | 115/— | 68/1.76 | 88/1.71 | 67/1.58 | 76/1.59 |
| 6 days | 73/1.57 | —/— | —/— | —/— | 67/1.60 | 76/1.56 |
| 7 days | —/— | —/— | —/— | —/— | —/— | —/— |
| 12 days | 73/1.63 | —/— | —/— | —/— | —/— | 76/1.54 |

Example 2

Table 2 summarizes the formulations used and results obtained from evaluations performed using a high pressure foam machine. The materials listed were blended to form the isocyanate reactive component. Foams were prepared using a high pressure foam machine equipped with a Hennecke MQ-18 mix head. The liquid output was adjusted to a nominal 60 lb/minute and the recycle and pour pressures were held at 1500 psig. All evaluations were done using a Bosch panel mold with internal dimensions of 79 inches high by 8 inches wide by 2 inches thick and held at 120° F. The pre-foam mixture was injected into the mold through the pour hole located near the bottom while the mold was held in a vertical position. The minimum fill density was determined from three under-filled panels of various weights using a linear regression to determine the minimum weight of foam required to just fill the mold's interior volume. Packed panels for testing were then prepared at densities above the minimum fill density as shown in the Table.

Measurement of all foam properties was conducted using standard methods. Foam density was measured according to ASTM D-1622.

Measurement of k-factors were performed on 8×8×1 inch core foam samples using a LaserComp FOX 200 heat flow meter according to ASTM C-518. Closed cell contents were measured using a Gas Pycnometer according to ASTM D-6226. Compressive strength was measured perpendicular to flow at 10% compression following ASTM D-1621. Dimensional Stability was measured at −30 and +70° C. (−22 and +158° F.) according to ASTM D-212. Examples 2A-2E are comparative examples and Examples 2F-2G are inventive examples.

TABLE 2

| Material | 2A | 2B | 2C | 2D | 2E | 2F | 2G |
|---|---|---|---|---|---|---|---|
| POLYOL 1 | 38.74 | 31.66 | 30.72 | 30.96 | 30.85 | 29.86 | 29.86 |
| POLYOL 2 | 14.09 | 27.7 | 27.3 | 27.52 | 27.42 | 26.55 | 26.55 |
| POLYOL 3 | 17.62 | 10.39 | 10.24 | 10.32 | 10.28 | 9.95 | 9.95 |
| SURFACTANT | 2.83 | 2.91 | 2.91 | 2.91 | 2.91 | 2.90 | 2.90 |
| CATALYST A | 0.71 | 0.76 | 1.07 | 0.80 | — | — | — |
| CATALYST B | 0.35 | 0.38 | — | — | — | — | — |
| CATALYST C | — | — | — | — | — | 2.91 | 2.91 |
| CATALYST D | — | — | — | — | — | 0.97 | 0.97 |
| CATALYST E | — | — | 1.07 | 0.80 | — | 0.49 | 0.49 |
| CATALYST F | — | — | — | — | 1.85 | — | — |
| Water | 0.90 | 0.96 | 0.96 | 0.96 | 0.96 | 0.95 | 0.95 |
| HFC 245fa | 24.76 | — | — | — | — | — | — |
| HCFO 1233zd(E) | — | 25.73 | 25.73 | 25.73 | 25.73 | 25.42 | 25.42 |
| Total | 100.0 | 100.5 | 100.0 | 100.0 | 100.0 | 100.0 | 100.0 |
| ISOCYANATE | 98.2 | 106 | 106 | 106 | 106 | 103.3 | 103.3 |
| Polyol Temp (° F.) | 70 | 70 | 70 | 70 | 70 | 70 | 80 |
| Iso Temp (° F.) | 80 | 80 | 80 | 80 | 80 | 80 | 90 |

TABLE 2-continued

| Material | 2A | 2B | 2C | 2D | 2E | 2F | 2G |
|---|---|---|---|---|---|---|---|
| Gel Time, seconds | 39 | 40 | 31 | 41 | 32 | 44 | 32 |
| Free Rise Density, pcf | 1.30 | 1.42 | 1.31 | 1.38 | 1.38 | 1.47 | 1.24 |
| Min Fill Density, pcf | 1.90 | 1.91 | 1.87 | 1.90 | 1.90 | 2.02 | 1.87 |
| Packed Density | 2.11 | 2.10 | 2.08 | 2.10 | 2.09 | 2.22 | 2.06 |
| Over Pack | 10.9% | 9.9% | 11.2% | 10.5% | 10.0% | 9.9% | 10.2% |
| Core Density, pcf | 1.93 | 1.90 | 1.89 | 1.87 | 1.83 | 2.00 | 1.83 |
| Perp. Comp Strength, psi | 22.2 | 19.3 | 19.3 | 18.9 | 18.3 | 22.2 | 17.3 |
| Closed Cells, % | 91.0 | 92.2 | 92.3 | 93.1 | 91.6 | 92.4 | 90.4 |
| 35° F. k-Factor, BTU-in/hr-ft$^2$-° F. | 0.116 | 0.111 | 0.112 | 0.113 | 0.115 | 0.116 | 0.116 |
| 75° F. k-Factor, BTU-in/hr-ft$^2$-° F. | 0.132 | 0.125 | 0.124 | 0.126 | 0.129 | 0.129 | 0.129 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate-reactive composition comprising:
   (a) a polyol blend comprising, based on the total weight of the polyol blend:
      (1) 20 to 50% by weight of a saccharide initiated polyether polyol having an OH number of 200 to 600 mg KOH/g and a functionality of 4 to 6;
      (2) 40 to 55% by weight of an aromatic polyether polyol having an OH number of 170 to 600 mg KOH/g and a functionality of 3 to 5; and
      (3) 10 to 25% by weight of an aromatic polyester polyol having an OH number of 150 to 410 mg KOH/g and a functionality of 1.5 to 3;
   (b) a blowing agent composition comprising:
      (1) a physical blowing agent comprising at least 10% by weight, based on the total weight of the isocyanate-reactive composition, of a hydrochlorofluoroolefin (HCFO); and
      (2) a carbon dioxide generating chemical blowing agent; and
   (c) a catalyst composition comprising:
      (1) a morpholine;
      (2) an imidazole; and
      (3) an organometallic compound,
      wherein the morpholine (c)(1) is present in an amount of 1.5 to 2.5 parts by weight per 1 part by weight of the combination of imidazole (c)(2) and organometallic compound (c)(3) and the imidazole (c)(2) and organometallic compound (c)(3) are present in a weight ratio of 1.5 to 2.5:1.

2. The isocyanate-reactive composition of claim 1, wherein the aromatic polyether polyol and the saccharide-initiated polyether polyol are present in the polyol blend in a weight ratio of 1:1 to 2:1.

3. The isocyanate-reactive composition of claim 1, wherein the saccharide-initiated polyether polyol and the aromatic polyester polyol are present in the polyol blend in a weight ratio of 2:1 to 3:1.

4. The isocyanate-reactive composition of claim 1, wherein the aromatic polyether polyol and the aromatic polyester polyol are present in the polyol blend in a weight ratio of 2:1 to 4:1.

5. The isocyanate-reactive composition of claim 1, wherein the polyol blend comprises less than 20% by weight of the aromatic polyester polyol and/or the polyol blend comprises less than 25% by weight of ethylene oxide, based on the total weight of the saccharide initiated polyether polyol and the aromatic polyether polyol in the polyol blend.

6. The isocyanate-reactive composition of claim 1, wherein the HCFO is present in an amount of 15 to 30% by weight, based on the total weight of the isocyanate-reactive composition, and the HCFO and the carbon dioxide generating chemical blowing agent are present in an amount of at least 90% by weight, based on the total weight of the blowing agent composition.

7. The isocyanate-reactive composition of claim 6, wherein the HCFO and the carbon dioxide generating chemical blowing agent are present in the blowing agent composition at a weight ratio of 20:1 to 30:1.

8. The isocyanate-reactive composition of claim 1, wherein:
   (1) the morpholine catalyst comprises dimorpholinodiethylether;
   (2) the imidazole catalyst comprises 1,2-dimethylimidazole; and
   (3) the organometallic compounds comprises potassium octoate, potassium acetate, and/or potassium lactate.

9. The isocyanate-reactive composition of claim 1, wherein:
   (1) the morpholine catalyst is present in an amount of 40 to 85% by weight, based on the total weight of the catalyst composition,
   (2) the imidazole catalyst is present in an amount of 10 to 30% by weight, based on the total weight of the catalyst composition, and
   (3) the organometallic catalyst is present in an amount of 5 to 30% by weight, based on the total weight of the catalyst composition.

10. The isocyanate-reactive composition of claim 1, wherein the morpholine, imidazole, and organometallic compound are present in an amount of at least 90% by weight, based on the total weight of the catalyst composition.

11. A process for producing a rigid polyurethane foam, comprising mixing an isocyanate functional component with the isocyanate-reactive composition of claim 1 at an isocyanate index of from 90 to 140.

12. An isocyanate-reactive composition comprising:
   (a) a polyol blend comprising, based on the total weight of the polyol blend:

(1) 20 to 50% by weight of a saccharide initiated polyether polyol having an OH number of 200 to 600 mg KOH/g and a functionality of 4 to 6;

(2) 40 to 55% by weight of an aromatic polyether polyol having an OH number of 170 to 600 mg KOH/g and a functionality of 3 to 5; and (3) 10 to 25% by weight of an aromatic polyester polyol having an OH number of 150 to 410 mg KOH/g and a functionality of 1.5 to 3;

(b) a blowing agent composition comprising:

(1) a physical blowing agent comprising at least 10% by weight, based on the total weight of the isocyanate-reactive composition, of a hydrochlorofluoroolefin; and (2) a carbon dioxide generating chemical blowing agent; and (c) a catalyst composition comprising:

(1) a morpholine;

(2) an imidazole; and (3) a catalyst comprising dibutyltin dilaurate, dibutyltin diacetate, stannous octoate, potassium octoate, potassium acetate, potassium lactate, or a combination thereof wherein the morpholine (c)(1) is present in an amount of 1.5 to 2.5 parts by weight per 1 part by weight of the combination of catalyst (c)(2) and catalyst (c)(3) and the catalyst (c)(2) and the catalyst (c)(3) are present in a weight ratio of 1.5 to 2.5:1.

13. The isocyanate-reactive composition of claim 12, wherein the aromatic polyether polyol and the saccharide-initiated polyether polyol are present in the polyol blend in a weight ratio of 1:1 to 2:1.

14. The isocyanate-reactive composition of claim 12, wherein the saccharide-initiated polyether polyol and the aromatic polyester polyol are present in the polyol blend in a weight ratio of 2:1 to 3:1.

15. The isocyanate-reactive composition of claim 12, wherein the aromatic polyether polyol and the aromatic polyester polyol are present in the polyol blend in a weight ratio of 2:1 to 4:1.

16. The isocyanate-reactive composition of claim 12, wherein the polyol blend comprises less than 20% by weight of the aromatic polyester polyol and/or the polyol blend comprises less than 25% by weight of ethylene oxide, based on the total weight of the saccharide initiated polyether polyol and the aromatic polyether polyol in the polyol blend.

17. The isocyanate-reactive composition of claim 12, wherein the HCFO is present in an amount of 15 to 30% by weight, based on the total weight of the isocyanate-reactive composition, and the HCFO and the carbon dioxide generating chemical blowing agent are present in an amount of at least 90% by weight, based on the total weight of the blowing agent composition.

18. The isocyanate-reactive composition of claim 17, wherein the HCFO and the carbon dioxide generating chemical blowing agent are present in the blowing agent composition at a weight ratio of 20:1 to 30:1.

19. The isocyanate-reactive composition of claim 12, wherein:

(1) the morpholine catalyst comprises dimorpholinodiethylether; and (2) the imidazole catalyst comprises 1,2-dimethylimidazole.

20. The isocyanate-reactive composition of claim 12, wherein:

(1) the morpholine catalyst is present in an amount of 40 to 85% by weight, based on the total weight of the catalyst composition, (2) the imidazole catalyst is present in an amount of 10 to 30% by weight, based on the total weight of the catalyst composition, and (3) the organometallic catalyst is present in an amount of 5 to 30% by weight, based on the total weight of the catalyst composition.

21. The isocyanate-reactive composition of claim 12, wherein the morpholine, imidazole, and organometallic compound are present in an amount of at least 90% by weight, based on the total weight of the catalyst composition.

22. A process for producing a rigid polyurethane foam, comprising mixing an isocyanate functional component with the isocyanate-reactive composition of claim 12 at an isocyanate index of from 90 to 140.

* * * * *